(12) United States Patent
Henry

(10) Patent No.: US 6,722,407 B2
(45) Date of Patent: Apr. 20, 2004

(54) CAPLESS FUEL REFILLING SYSTEM

(75) Inventor: Richard Henry, Chesterfield, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/213,478

(22) Filed: Aug. 7, 2002

(65) Prior Publication Data

US 2004/0025967 A1 Feb. 12, 2004

(51) Int. Cl.⁷ ............................................. B60K 15/00
(52) U.S. Cl. ...................... 141/350; 141/312; 220/86.2; 296/97.22
(58) Field of Search .......................... 141/312, 348–350; 220/86.2; 296/97.22

(56) References Cited

U.S. PATENT DOCUMENTS

| | | |
|---|---|---|
| 5,730,194 A | 3/1998 | Foltz .......................... 141/301 |
| 5,732,840 A | 3/1998 | Foltz .......................... 220/86.2 |
| 5,901,760 A | 5/1999 | Parker et al. ................ 141/312 |
| 5,931,206 A | 8/1999 | Simdon et al. .............. 141/312 |
| 6,009,920 A | 1/2000 | Palvoelgyi et al. ......... 141/348 |
| 6,033,006 A * | 3/2000 | Bovellan et al. .......... 296/97.22 |
| 6,092,685 A | 7/2000 | Gruber ....................... 220/86.2 |
| 6,155,316 A | 12/2000 | Benjey ........................ 141/348 |
| 6,206,339 B1 | 3/2001 | Parker et al. .......... 251/129.03 |
| 6,435,233 B1 * | 8/2002 | Miura et al. ................ 141/390 |

* cited by examiner

Primary Examiner—J. Casimer Jacyna
(74) Attorney, Agent, or Firm—Ralph E. Smith

(57) ABSTRACT

The present invention provides a two-piece capless fuel-filling device and method of attaching the same to a vehicle. The capless fuel-filling device includes two primary components, an exterior housing member and an interior housing member. The exterior housing member is first placed within an opening formed in a vehicle body panel and attached thereto. Next, the interior housing member is attached to the exterior housing member or the interior side of the body panel. Either the internal housing member or the external housing member includes a valve for enabling and restricting insertion of a refueling nozzle.

5 Claims, 4 Drawing Sheets

CAPLESS FUEL REFILLING SYSTEM

FIELD OF THE INVENTION

The present invention relates to a capless automotive fuel-filling device, more particularly a two-piece capless fuel-filling device and a method for attaching the same to the body of an automotive vehicle during the assembly process.

BACKGROUND OF THE INVENTION

Automobiles typically include a fuel-filling assembly including a door and a fuel cap on or near the side of the car body. To fill the fuel tank, a user must open the fuel door and remove the fuel cap. Often when performing this task, the user will get fuel or dirt on their hands and possibly their clothing. One obvious improvement on this fuel-filling process is to eliminate the task of removing the fuel cap. Such capless devices have been described in U.S. Pat. No. 5,730,194, U.S. Pat. No. 5,901,760, U.S. Pat. No. 5,931,206, U.S. Pat. No. 6,009,920, U.S. Pat. No. 6,092,685, and U.S. Pat. No. 6,155,316.

While the aforesaid devices have effectively eliminated the need for a fuel cap, a practical method of attaching them to a vehicle during the assembly process has evaded vehicle manufacturers. During assembly, current fuel-filling devices are attached to the body panel of a vehicle by insertion through an opening from the exterior side of the body panel, whereafter they are attached to the body panel and the fuel-filler pipe. The details and designs of the aforesaid capless fuel-filling devices are not easily used with current assembly methods, and to reconfigure the assembly process would be costly and inefficient.

SUMMARY OF THE INVENTION

The present invention provides a two-piece capless fuel-filling device and a method of attaching the same to a vehicle. The capless fuel-filling device includes two primary components, an exterior housing member and an interior housing member. An exterior housing member includes a face plate and is placed within an opening formed in the vehicle body panel, and attached thereto. Next, an interior housing component includes a valve for restricting and enabling insertion of a refueling nozzle, and is attached to the exterior housing component or an interior side of the body panel, thus creating the effect of a single capless fuel-filling device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or its uses.

Figure 1:
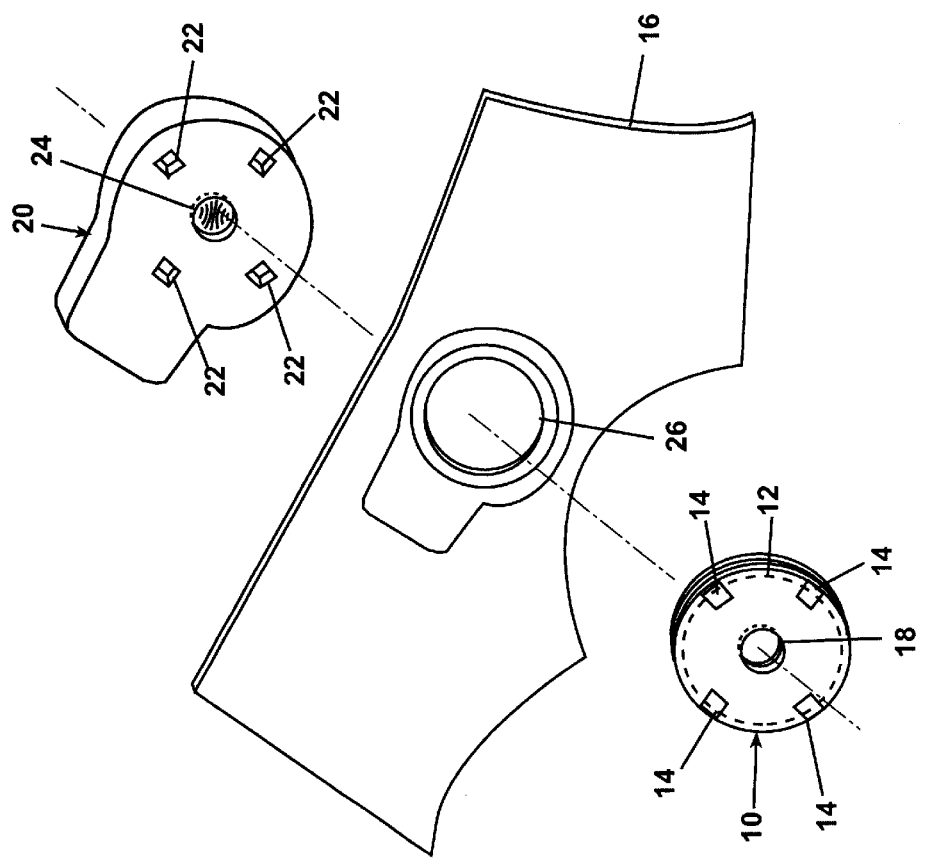
FIG. 1 is an exploded view of a two-piece capless fuel-filling device exemplary of the present invention.

With reference to FIG. 1, an exemplary two-piece capless fuel-filling device is shown with a body panel 16 of an automotive vehicle. An exterior housing member 10 is shown as a face plate having a flange 12, and an interior portion 28 (not labeled in FIG. 1) having a first attachment system consisting of a plurality of attachment hooks 14, shown in more detail in FIGS. 2 and 4. It should be appreciated that, while the first attachment system shown includes a plurality of attachment hooks 14, any means for attaching the exterior housing member 10 to the body panel 16 is included within the scope of the invention, such as fasteners, welds, or adhesives. Furthermore, the exterior housing member 10 is shown having an opening 18 for a fuel nozzle to penetrate during refueling.

FIG. 1 also shows an interior housing member 20 having a second attachment system including a plurality of attachment slots 22. It should be appreciated that, while the second attachment system shown includes a plurality of attachment slots 22, any means for attaching the interior housing member 20 to the exterior housing member 10 is included within the scope of the invention, such as fasteners, welds, or adhesives. In an exemplary embodiment, the second housing member 20 also includes a valve device 24 for enabling and restricting access of a refueling nozzle. In an alternative embodiment, the valve device 24 is included in the exterior housing member 10.

Figure 2:
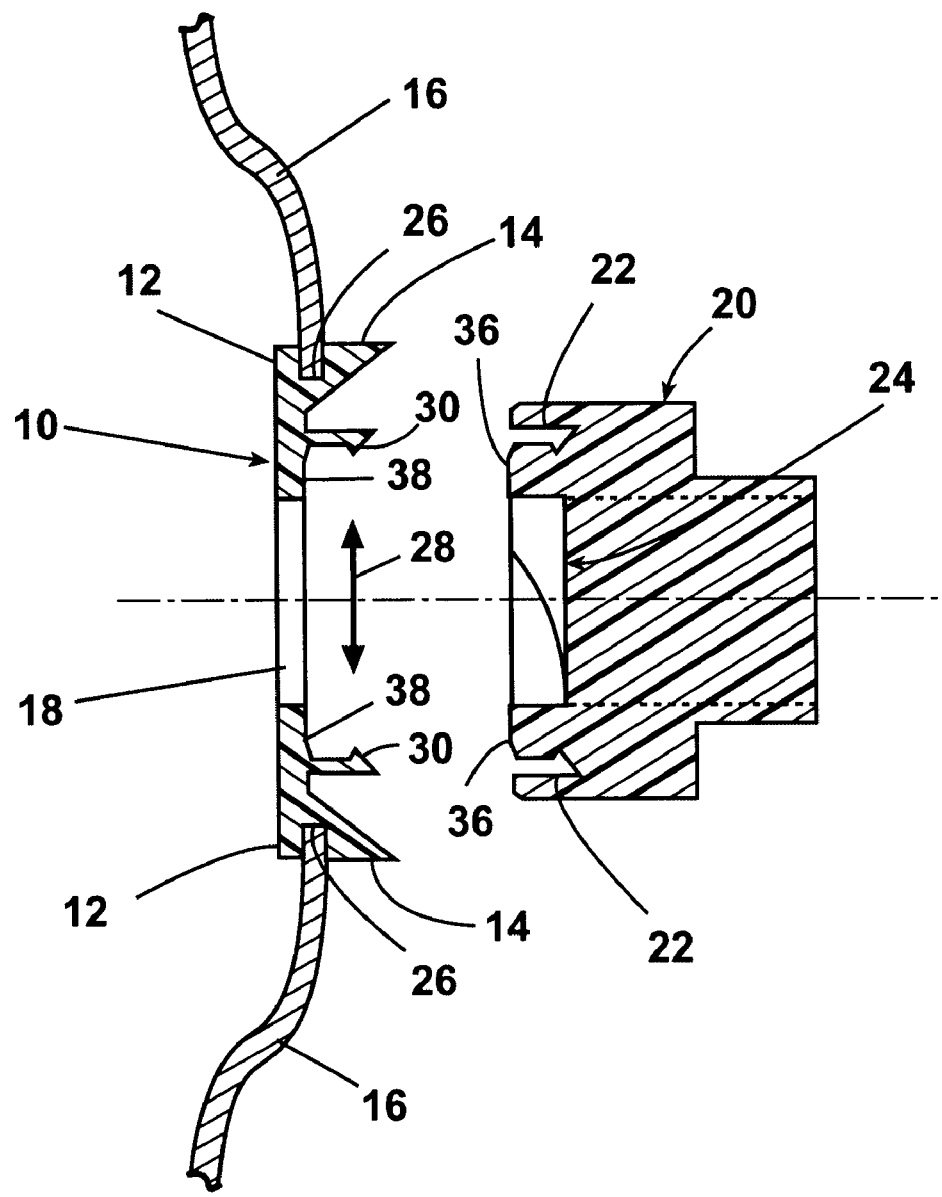
FIG. 2 is a cross sectional view of a two-piece capless fuel-filling device exemplary of the present invention.

With reference now to FIG. 2, a two-piece capless fuel-filling device is shown in mid-assembly. An exemplary embodiment of a capless fuel-filling device enables attachment of the device to a vehicle body panel 16. Accordingly, FIG. 2 shows the exterior housing member 10 inserted through an opening 26 in the body panel 16 with the flange 12 abutting an exterior face of the body panel 16 and the hooks 14 of the first attachment system interlocking the body panel 16 to secure the exterior housing member 10 to the body panel 16. It should be appreciated that any means for attaching the exterior housing member 10 to the body panel 16 is included within the scope of the invention, such as fasteners, welds, or adhesives.

After the exterior housing member 10 is attached to the body panel 16, the interior housing member 20 is attached to the interior portion 28 of the exterior housing member 10 by engaging the second attachment assembly as shown. The second attachment assembly includes a plurality of attachment slots 22 adapted to mate with a plurality of attachment hooks 30 on the interior portion 28 of the exterior housing member 10 such that a first planar surface 36 on the interior housing member 20 abuts and seals against a second planar surface 38 on the exterior housing member 10. It should be appreciated that while an exemplary embodiment includes attaching the interior housing member 20 to the interior portion 28 of the exterior housing member 10 via a second attachment assembly, the interior housing member 20 could also be attached to an interior side of the body panel as discussed below.

Figure 3:
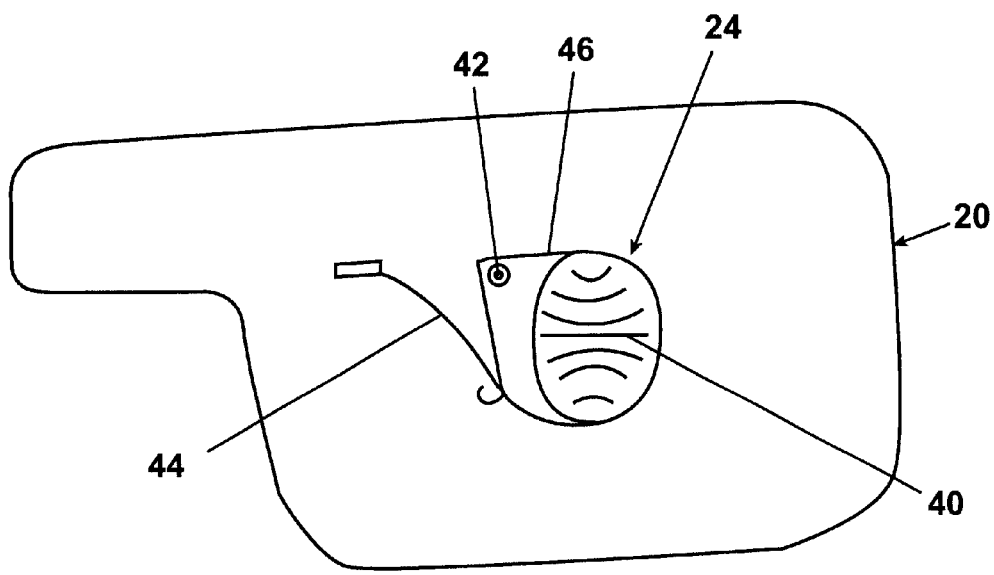
FIG. 3 is a view of an interior housing member including a detailed valve device.
Figure 4:
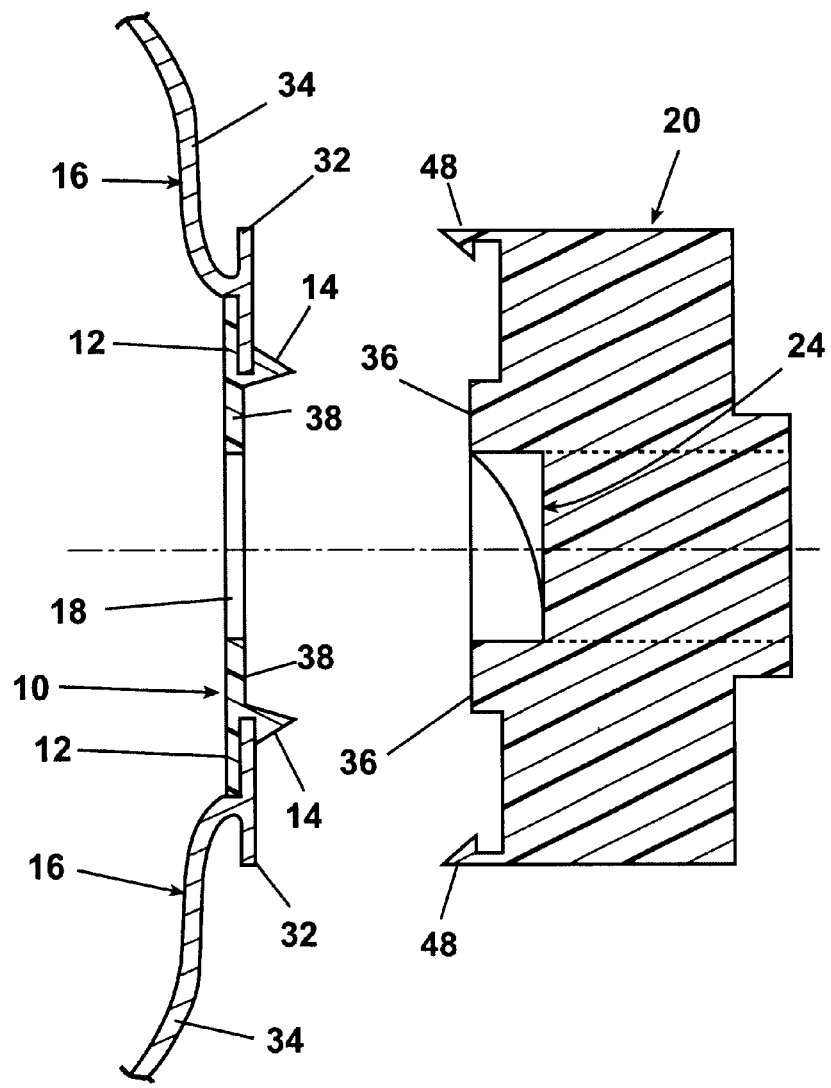
FIG. 4 is a cross sectional view of a two-piece capless fuel-filling device exemplary of an alternative embodiment of the present invention.

An exemplary valve device 24 is shown in FIG. 3. The valve device 24 includes a single lever 46 having a concave face 40. The valve device 24 further includes a pin 42 for attaching the lever 46 to the interior housing member 20 and establishing a pivot point for the lever 46. Furthermore, the valve device 24 includes a biasing member 44 for biasing the lever 46 into a closed position (as illustrated in FIG. 4). A user actuates the lever 46 by pressing a fuel-filling nozzle against the concave face 40 of the valve device 24. The concave face 40 transfers the applied force perpendicularly, thus enabling a user to overcome the biasing force created by the biasing member 44 and open the lever 46. It should be appreciated that while the biasing member 44 is shown to be a simple arc spring, other biasing members, such as tension springs, compression springs, or coil springs are included within the scope of the invention. It should also be appreciated that while one embodiment of the valve device 24 includes a simple lever 46, other valve devices such as hinged valve devices and ball valve devices are included within the scope of the invention. Lastly, it should be appreciated that while one embodiment includes positioning the valve device 24 on the interior housing member 20, an alternative embodiment positions the valve device 24 on the exterior housing member 10.

With reference now to FIG. 4, an alternative embodiment of a two-piece capless fuel-filling device is shown in mid-assembly. The exterior housing member 10 has been inserted through an opening 26 in the body panel 16 with the flange 12 abutting a face of the body panel 16, whereby the hooks 14 of the first attachment system interlock the body panel 16 to secure the exterior housing member. It should be appreciated that while FIG. 4 shows a plurality of attachment hooks 14 as the means for attaching the exterior housing member 10 to the body panel 16, other means are included within the scope of the invention, such as fasteners, welds, or adhesives.

After the exterior housing member 10 is attached to the body panel 16, the interior housing member 20 is attached to an interior face 34 of the body panel 16 by engagement of the second attachment system. The second attachment system includes a plurality of attachment hooks 48 adapted to mate with a portion 32 of the interior side 34 of the body panel 16 such that a first planar face 36 on the interior housing member 20 abuts and seals against a second planar face 38 on said exterior housing member 10. It should be appreciated that while FIG. 4 shows a plurality of attachment hooks 48 as the means for attaching the interior housing member 20 to the body panel 16, other means are included within the scope of the invention, such as fasteners, welds, or adhesives.

This description of the present invention is merely exemplary in nature and, thus, variations that do not depart from the gist of the invention are intended to be within the scope of the invention. Such variations are not to be regarded as a departure from the spirit and scope of the invention.

What is claimed is:

1. A two-piece capless fuel-filing device for attachment to a motor vehicle body panel, comprising:

an exterior housing member having a first attachment system and an interior portion adapted to extend through an opening in the body panel wherein said first attachment system is adapted to secure said exterior housing member to the body panel and said first attachment system includes a plurality of attachment hooks adapted to engage an inner surface of the body panel and a flange adapted to engage an exterior surface of the body panel, and an interior housing member having a second attachment system adapted to engage with one of said exterior housing member and said body panel to provide sealing engagement with said interior portion, said interior housing member generally positioned on an opposite side of said body panel as said exterior housing member.

2. The two-piece capless fuel-filling device of claim 1, wherein said second attachment system includes a plurality of hooks adapted to engage a flange formed on an interior surface of said body panel.

3. The two-piece capless fuel-filling device of claim 1, wherein said exterior housing member includes a valve device for restricting and enabling penetration by a refueling nozzle.

4. A two-piece capless fuel-filling device for attachment to a motor vehicle body panel, comprising;

an exterior housing member having a first attachment system and an interior portion adapted to extend through an opening in the body panel; and an interior housing member having a second attachment system adapted to engage with one of said exterior housing member and said body panel to provide sealing engagement with said interior portion, said interior housing member generally positioned on an opposite side of said body panel as said exterior housing member and said second attachment system includes a plurality of attachment slots engageable with a plurality of attachment hooks.

5. A two-piece capless fuel-filling device for attachment to a motor vehicle body panel, comprising:

an exterior housing member having a first attachment system and an interior portion adapted to extend through an opening in the body panel; and an interior housing member having a second attachment system adapted to engage with one of said exterior housing member and said body panel to provide sealing engagement with said interior portion, said interior housing member generally positioned on an opposite side of said body panel as said exterior housing member and said interior housing member includes a valve device for restricting and enabling penetration by a refueling nozzle.

* * * * *